United States Patent [19]
Wilcox

[11] Patent Number: 5,255,716
[45] Date of Patent: Oct. 26, 1993

[54] PIPE RECTIFIER FOR STABILIZING FLUID FLOW

[75] Inventor: Paul L. Wilcox, Haugesund, Norway

[73] Assignees: Total Compagnie Francaise des Petroles, Paris, France; Den Norske Stats Oljeselskap AS, Stavanger, Norway

[21] Appl. No.: 707,252

[22] Filed: May 23, 1991

Related U.S. Application Data

[63] Continuation of Ser. No. 449,265, Dec. 12, 1989, abandoned.

[30] Foreign Application Priority Data

Dec. 13, 1988 [FR] France .................. 88 16380

[51] Int. Cl.$^5$ .................................................. F15D 1/00
[52] U.S. Cl. ............................................ 138/44; 138/40; 138/39; 428/596
[58] Field of Search ............... 138/40, 41, 37, 39, 138/44; 73/861.52; 428/131, 596

[56] References Cited

U.S. PATENT DOCUMENTS

| | | | |
|---|---|---|---|
| Re. 31,258 | 5/1983 | De Baun | 138/37 |
| 1,503,371 | 7/1924 | Meyer | 138/44 |
| 2,600,733 | 6/1952 | Clift | 138/37 |
| 2,688,985 | 9/1954 | Holdenreid | 138/37 |
| 2,825,203 | 3/1958 | Bertin et al. | 138/44 |
| 3,191,630 | 6/1965 | Demyan | 138/37 |
| 3,250,469 | 5/1966 | Colston | 73/861.52 |
| 3,572,391 | 3/1971 | Hirsch | 138/37 |
| 3,733,898 | 5/1973 | Yamamoto et al. | 138/39 |
| 3,838,598 | 10/1974 | Tompkins | 73/861.52 |
| 4,559,275 | 12/1985 | Matt et al. | 138/37 |
| 4,688,755 | 8/1987 | Pluviose | 138/44 |

FOREIGN PATENT DOCUMENTS 60-196414  10/1985  Japan .................. 138/37

*Primary Examiner*—James E. Bryant, III
*Attorney, Agent, or Firm*—Sughrue, Mion, Zinn, Macpeak & Seas

[57] ABSTRACT

A rectifier for establishing a flat fluid flow velocity profile in a pipe 16 is composed of a bundle of cylindrical tubes 12 of the same diameter and length, assembled to form a cylindrical block 10 having a diameter equal to the interior diameter of the pipe and having a honeycomb section. The interstices 18 remaining between the tubes of a median ring $r_2$ are filled with a suitable filling material, while those 20 between the tubes of an outer ring $r_1$ and those in a central zone $r_3$ of the rectifier are left open.

5 Claims, 2 Drawing Sheets

PIPE RECTIFIER FOR STABILIZING FLUID FLOW

This is a Continuation, of application Ser. No. 07/449,265, filed Dec. 12, 1989, now abandoned.

BACKGROUND OF THE INVENTION

This invention concerns a rectifier for regulating or stabilizing the flow of a liquid or gaseous fluid circulating in a tubular duct or pipe, where the fluid flow is irregular or turbulent as a result of passing through an obstacle such as a bend, a junction in the duct, or a valve. The use of such a rectifier to facilitate the measurement of fluid flow constitutes a particularly important application since, as is well known, measurements conducted using a flow meter provide a more correct indication if the flow is completely configured as a very flat profile with a flow direction parallel to the pipe axis.

A variety of rectifiers of this type are already on the market, e.g., perforated disks, screens, metal fabrics, or a combination of these components, the entire assembly being inserted into the duct. For example, a known rectifier is composed of a screen to the upstream surface of which is attached a perforated disk whose holes have a diameter which increases toward the center and diminishes toward the circumference.

However, all of these rectifiers have several major disadvantages:

Their effectiveness is relatively low, since it has been found that the fluid flow remains irregular over a length of the duct downstream from the rectifiers and measuring more than 10 D, where D is the interior diameter of the duct. Accordingly, a flow meter can be installed only at one end of a pipe length greater than 10 D, thereby creating bulky fittings.

The flow-rate pattern obtained downstream from these rectifiers has a rounded profile, signifying that there are sizable differences between the rate of flow along the axis of the duct and the rate of flow in proximity to the wall.

The manufacturing cost is high, especially as regards the rectifier according to the last of the embodiments above, because of the uneven distribution of hole diameters over the disk surface.

All such rectifiers must increase in thickness as the duct diameter becomes greater, this thickness varying between approximately 0.13 D and 2 D. It is obvious that, in the case of large-diameter pipes and thus of very thick rectifiers, the latter must be permanently installed in the pipe since it is virtually impossible to take them out.

SUMMARY OF THE INVENTION

The present invention is aimed at overcoming these disadvantages, and concerns, for this purpose, a flow rectifier made of a cylindrical element having uniform thickness and a diameter equal to the interior diameter of the pipe, and which has, distributed evenly over its entire surface, a multiplicity of axial cylindrical passages having the same diameter and equidistant from each other, the gaps or interstices between the passages located on a median ring of the rectifier being closed, while the gaps or interstices between the passages located in an outer peripheral ring and between those in a central zone of the rectifier are open.

According to a first embodiment, the rectifier is made up of a bundle of cylindrical tubes of the same diameter and length, assembled to form a cylindrical block whose total diameter is equal to the interior diameter of the duct, and to incorporate a honeycomb section. The gaps remaining between the tubes in the median ring are filled with a suitable filling material, while those located between the tubes in the outer ring and in the central zone of the rectifier are left open.

A major advantage of the rectifier is that the same length may always be imparted to it, irrespective of the diameter of the duct in which the rectifier is installed. Tests have shown that, using a rectifier composed of tubes 50 mm in length and whose interior and exterior diameters are approximately 10 mm and 8 mm respectively, fluid flow may be made uniform in any duct whatever, without imposing an upper limit on the diameter.

As a result, the rectifier has the advantage that it may be easily removed from the duct while leaving the latter pressurized. To accomplish this, one need only insert the rectifier in a spherical triple-channel valve. In the closed position of the valve, the rectifier is positioned perpendicular to the fluid current. By turning the valve one-quarter turn from this position, one may remove the rectifier through a lateral opening. On the other hand, the prior art rectifiers cannot always be inserted in a valve, since, as has already been explained, they may have a thickness (axial length) of up to twice the diameter of the pipe.

According to another embodiment of the invention, the rectifier is made up of a cylindrical block whose diameter is equal to the interior diameter of the pipe and through which a multiplicity of cylindrical passages is drilled axially, these passages having the same diameter and being equidistant and distributed evenly with axial symmetry. Interstices are formed axially over the entire block by removing, using any suitable technique, the material between the passages of an outer peripheral ring and a central zone of the block, while the material located between the passages of the median ring is left intact.

According to yet another variant of the invention, the rectifier may be formed in a single operation by casting a block of material in a mold having raised patterns suitable for the formation of passages and interstices at the desired places.

DETAILED DESCRIPTION OF THE PREFERRED EMBODIMENTS

Figure 1:
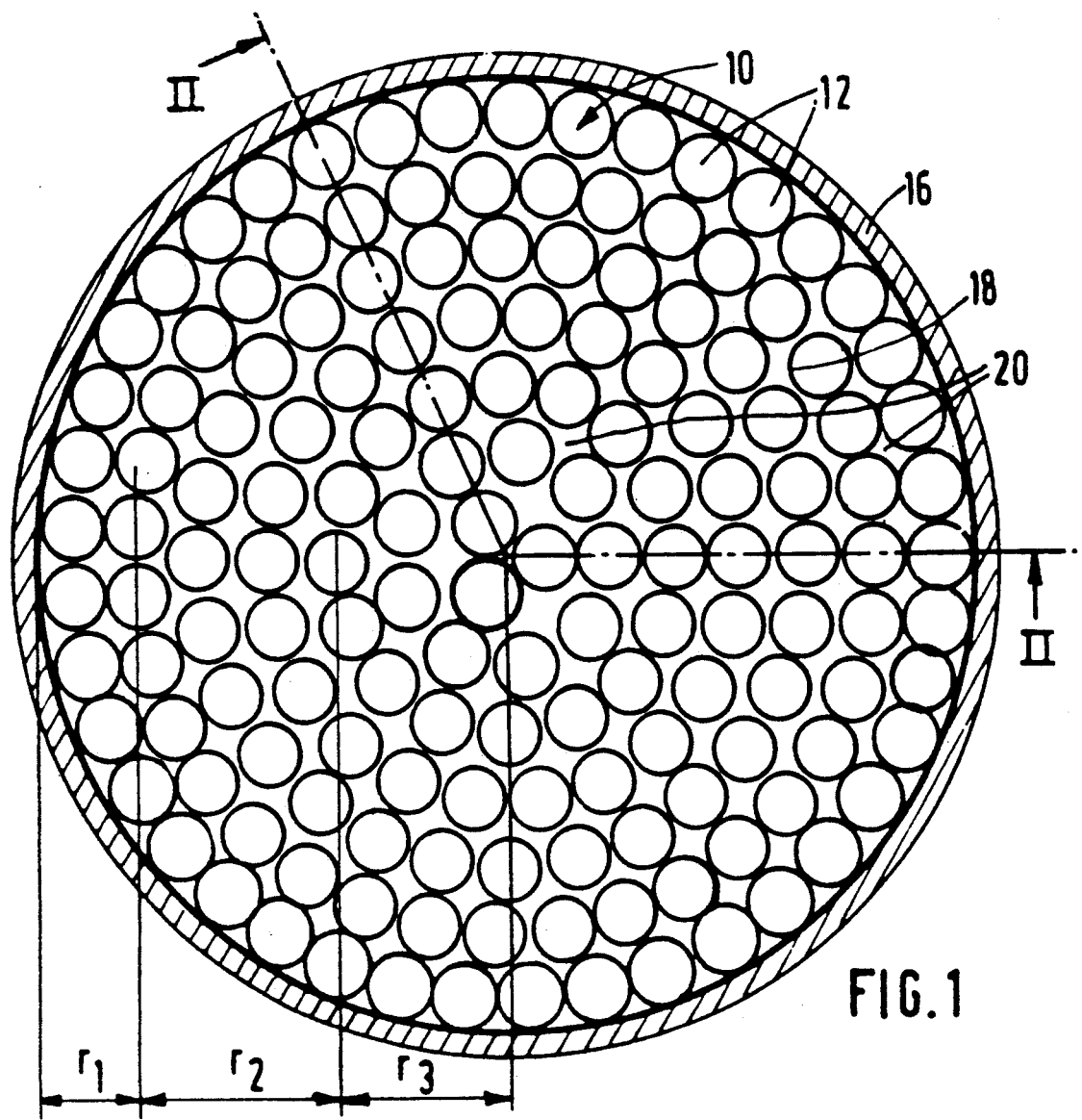
FIG. 1 is a transverse cross-section of a duct fitted with a rectifier formed from a bundle of tubes according to the invention.
Figure 2:
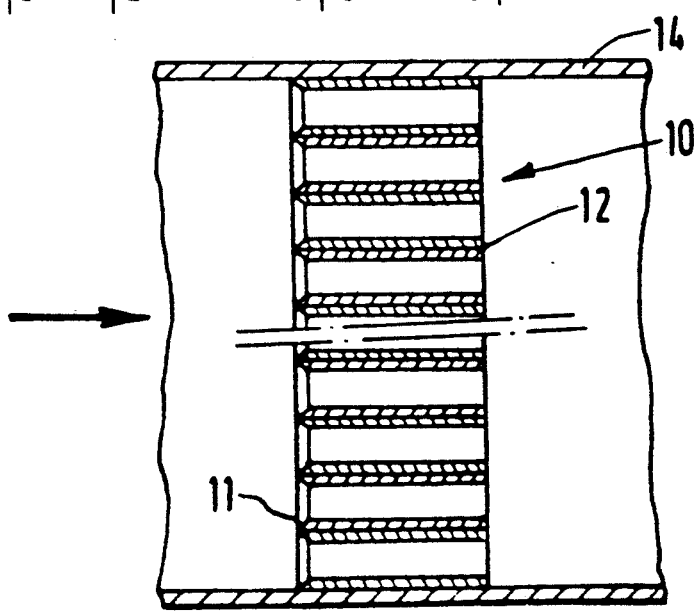
FIG. 2 is a partial axial cross-section taken alone line II—II in FIG. 1.

Referring to FIGS. 1 and 2, a flow rectifier 10 is composed of a bundle of identical, parallel tubes 12 having chamfered upstream edges 11. The tubes are assembled and joined together using any appropriate means to form a cylindrical block whose outer diameter is approximately equal to the internal diameter of a duct 16 in which it is to be installed.

Interstices, some of which are filled and others of which are left open, remain between the tubes. More precisely, the gaps or interstices 18 situated in a median ring of predetermined radial thickness $r_2$ are filled, while those 20 situated in a peripheral ring having thickness $r_1$, located to the outside of the median ring, as well as those located in a central zone of radius $r_3$, are left open. The sum of $r_1+r_2+r_3$ is, of course, equal to the interior radius of the duct.

As an illustrative example and as shown in FIG. 1, a rectifier 141.7 mm in diameter has been built from 154 tubes distributed in a density of 41 tubes in a first, outermost layer or ring, 35 in a second ring, 28 in a third ring, 22 in a fourth ring, 16 in a fifth ring, 9 in a sixth ring, and 3 in an internal or central ring. The interstices between the first and second rings are open, those located between the second and fifth rings are filled, and those to the inside of the fifth ring are open.

Very good results were obtained using a diameter of 141.7 mm when $r_1$ is between 6 and 36 mm, $r_2$ is between 18 and 54 mm, and $r_3$ is between 18 and 54 mm. The length of the tubes may fall between 30 and 150 mm, their external diameter between 6 and 26 mm, and their interior diameter between 4 and 24 mm.

The rectifier may also be made from a solid cylindrical disk in which a multiplicity of equidistant, cylindrical passages of the same diameter are drilled axially. In the outer peripheral ring and in the central part of the rectifier, material is removed between the passages to form interstices using any conventional technique, for example by electroerosion.

The rectifier may also be made in a single operation, by molding in a matrix having an appropriate shape.

Figure 3:
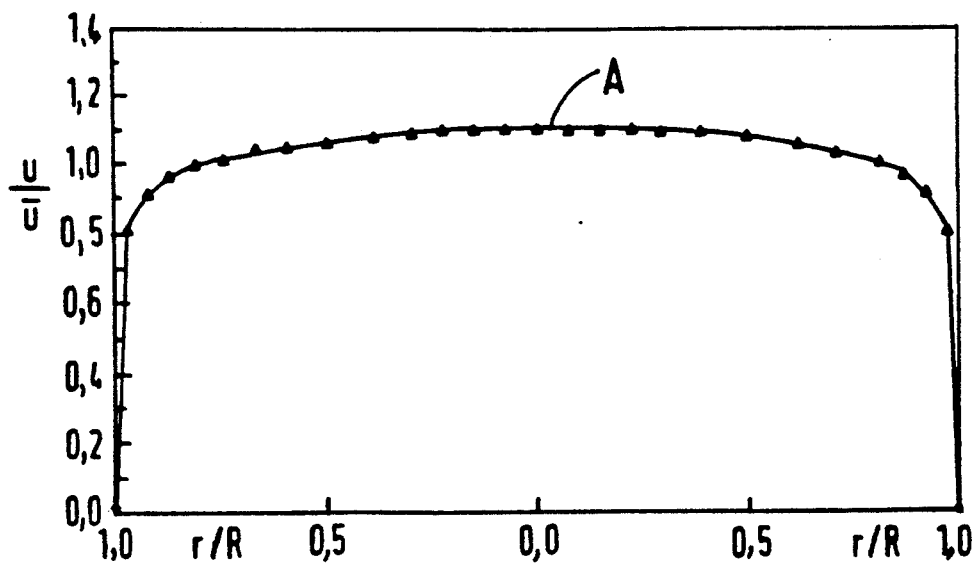
FIG. 3 is a diagram representing the flow-rate pattern obtained using a rectifier according to the invention mounted downstream from two successive bends falling in different planes.

FIG. 3 is a diagram illustrating the effect produced by the rectifier according to the invention on a flow which has been made irregular after passing through two 90° bends falling in two different planes. The rectifier was mounted downstream at a distance of 4 D from the outlet of the second bend; measurements were taken at 6 D downstream from the rectifier. The value r/R lies on the abscissa, in which R is the radius of the pipe and r is the distance from a radial measurement point to the axis of the pipe. On the ordinate, $u/\bar{u}$ is the ratio between the flow-rate u at each measurement point and the nominal flow-rate $\bar{u}$.

It will be seen that the flow-rate pattern A obtained is extremely flat, which indicates that, with the exception of a slight thickness of fluid which flows against the interior wall of the pipe, the fluid current has virtually the same flow-rate over the entire pipe section. This is a significant benefit because, under the same operating conditions, a rectifier made according to the above-mentioned prior art provides only a rounded flow-rate pattern, in which the flow-rate decreases substantially as one moves from the central axis toward the wall of the pipe. Furthermore, the angle of gyration is reduced by at least 2°. Experience has also shown that at a distance of 10 D, the angle of the bends produces almost no effect on the appearance of the flow-rate pattern or on the angle of gyration.

Figure 4:
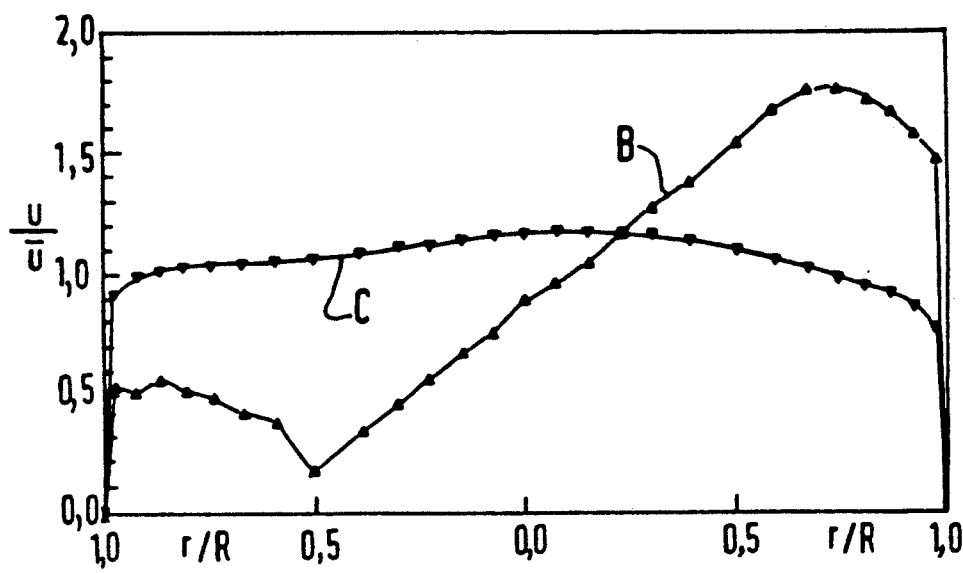
FIG. 4 is a diagram showing the flow-rate pattern obtained using a rectifier according to the invention mounted downstream from a valve opened one-quarter turn.

The curve in FIG. 4 was obtained under the following conditions: the rectifier was installed downstream from a valve opened one-quarter turn, thereby creating an irregularity in the fluid flow. Curves B and C show, respectively, the flow-rate diagrams recorded at 1.5 D and 5.5 D downstream from the rectifier outlet. As curve B shows, the current is distributed at the valve outlet. On the other hand, curve C shows that the flow is already substantially uniform over the entire section of pipe at 5.5 D from the rectifier.

Figure 5:
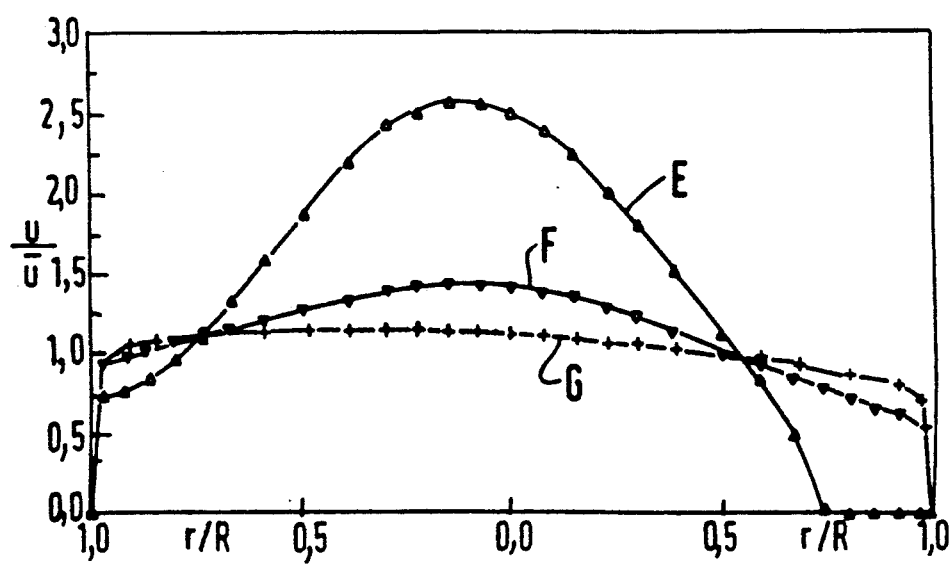
FIG. 5 is a flow-rate diagram obtained using a rectifier according to the invention mounted downstream from a strong, eddy producing disturbance.

FIG. 5 again shows the effect of the rectifier according to the invention on a strongly disturbed flow. The rectifier was installed at 1.5 D downstream from the point at which the disturbance begins. The flow-rate diagram at this point is represented by curve E. Curves F and G are the flow-rate patterns at 2.5 D and 8.5 D, respectively, downstream from the rectifier. It may be seen that, at this latter distance, the flow has become virtually uniform.

In conclusion, the rectifier according to the invention is perfectly suited for measurement of the flow of a fluid in pipes of any diameter whatever, and more especially in large-diameter pipes. It is easy to manufacture because the passages (or tubes) have the same diameter and are distributed uniformly over the entire surface of the rectifier. Furthermore, the thickness of the rectifier and the diameter of the passages are not dependent on the diameter of the pipe, as was the case for the above-mentioned rectifiers made according to the prior art. Because of its slight thickness, the rectifier according to the invention may be easily installed and removed from the pipe, by inserting it in a spherical valve. Finally, it makes it possible to obtain a uniform flow over a short length of the pipe.

I claim:

1. A rectifier for stabilizing fluid flow in a pipe (16), comprising: a cylindrical element (10) of constant axial length and having a diameter equal to the interior diameter of the pipe (16), said cylindrical element defining a multiplicity of uniformly distributed, cylindrical, axially parallel, tubular through passages (12) and a multiplicity of interstices defined between adjacent passages by outer surfaces thereof, said passages having the same diameter and being equidistant from each other, fluid flow blockage means closing interstices (18) located between passages disposed in a median ring ($r_2$) of the rectifier, while interstices (20) located between passages disposed in an outer peripheral ring ($r_1$) and in a central zone ($r_3$) of the rectifier remain open to fluid flow to thereby establish a more uniform flow velocity distribution across the pipe.

2. A rectifier according to claim 1, wherein said cylindrical element comprises a bundle of cylindrical tubes (12) of the same diameter and length, assembled to form a cylindrical block having a diameter equal to the interior diameter of the pipe, and wherein said fluid flow blockage means comprises a packing material.

3. A rectifier according to claim 1, wherein said cylindrical element comprises a cylindrical block, and said through passages comprise a multiplicity of axially drilled holes, the open interstices being defined by the removal of material between the passages of the outer peripheral ring and the central zone of the block, with the closed interstices located between the passages of the median ring being left intact.

4. A rectifier according to claim 1, wherein said rectifier has a uniform axial length whatever the diameter of the pipe in which it is placed.

5. A rectifier according to claim 2, wherein the length of the tubes falls between 30 and 150 mm, their external diameter falls between 6 and 28 mm, and their interior diameter falls between 4 and 24 mm.

* * * * *